United States Patent
Hancosky

(10) Patent No.: US 9,574,335 B2
(45) Date of Patent: Feb. 21, 2017

(54) DRAIN TRAP ADAPTOR

(71) Applicant: Jack Hancosky, Avoca, NY (US)

(72) Inventor: Jack Hancosky, Avoca, NY (US)

(73) Assignee: Precision Accuracy Solutions, Inc., Webster, NY (US)

( * ) Notice: Subject to any disclaimer, the term of this patent is extended or adjusted under 35 U.S.C. 154(b) by 0 days.

(21) Appl. No.: 15/043,148

(22) Filed: Feb. 12, 2016

(65) Prior Publication Data

US 2016/0237666 A1   Aug. 18, 2016

Related U.S. Application Data

(60) Provisional application No. 62/115,935, filed on Feb. 13, 2015.

(51) Int. Cl.
*E03C 1/30* (2006.01)
*F16K 5/06* (2006.01)
*E03C 1/282* (2006.01)

(52) U.S. Cl.
CPC ............... *E03C 1/30* (2013.01); *E03C 1/282* (2013.01); *F16K 5/06* (2013.01)

(58) Field of Classification Search
CPC ............ E03C 1/30; E03C 1/282; E03C 1/286; E03C 1/288
USPC ............................................ 4/255.01, 255.04
See application file for complete search history.

(56) References Cited

U.S. PATENT DOCUMENTS

| | | | |
|---|---|---|---|
| 1,515,073 A | 11/1924 | Savard | |
| 3,936,892 A * | 2/1976 | Miller | E03C 1/30 4/255.01 |
| 4,031,914 A | 6/1977 | Neri | |
| 4,263,934 A * | 4/1981 | Redden | A61C 17/046 137/140 |
| 4,915,133 A * | 4/1990 | Harrison | F16K 5/0605 137/625.47 |
| 5,075,905 A * | 12/1991 | Rutherford | E03C 1/282 137/247.51 |
| 6,915,814 B2 * | 7/2005 | Cheng | F16L 55/24 137/247.51 |

* cited by examiner

*Primary Examiner* — Janie Loeppke
(74) *Attorney, Agent, or Firm* — Tracy Jong Law Firm; Tracy P. Jong; Cheng Ning Jong

(57) ABSTRACT

A drain trap adaptor adapted to allow draining of a drain trap and retrieval of a material. The drain trap includes a first drain pipe having an entry portion and an exit portion, a second drain pipe extending from the exit portion and a bore disposed substantially at the exit portion. The drain trap adaptor includes a ball valve having an inlet end and an outlet end, wherein the inlet end is adapted to connect to the bore; and a container adapted to connect to the outlet end of the ball valve. The container is configured to receive the drainage trapped in the drain trap and the material at the bore upon opening of the ball valve such that the drain trap can be drained and the material can be retrieved.

18 Claims, 10 Drawing Sheets

DRAIN TRAP ADAPTOR

PRIORITY CLAIM AND RELATED APPLICATIONS

This non-provisional application claims the benefit of priority from provisional application U.S. Ser. No. 62/115,935 filed Feb. 13, 2015. Said application is incorporated by reference in its entirety.

BACKGROUND OF THE INVENTION

1. The Field of the Invention

The present invention is directed generally to a drain trap adaptor adapted to a drain trap. More specifically, the present invention is directed to a drain trap adaptor configured to allow the drain trap it is adapted to and the drain trap adaptor itself, to be drainable in a controlled fashion. The drain trap adaptor includes a space adapted to receive an item dropped into the drain trap it is adapted to, wherein the drain trap adaptor is adapted to be removable from the drain trap such that the contents of the space can be accessed.

2. Background Art

The need to clean out a clogged sink drain often requires one of the following actions be taken. A drain trap may be dismantled so that the clogged portions of the drain trap can be exposed and cleaned or replaced. Although conventional drain traps are not designed to allow retrieval of items that have become lodged in them, they may be dismantled so that their internals can be accessed or exposed such that items dropped in the drain trap may be retrieved. Drain traps come in permanent and semi-permanent configurations. Permanent configurations include metal or plastic plumbing materials having tubings and fittings that are permanently secured together, e.g., using glue, etc. Semi-permanent varieties includes those fittings and tubings which are secured together using techniques involving screw threads, friction fit or pressure fit, etc. Numerous clean out tools, either discretely available or integrally built into drain traps, have been attempted. However, none of the clean out tools are geared towards enabling a user to dismantle a drain trap without creating a messy situation, although many of these tools require that access to the drain trap be made available. None of the clean out tools are geared towards enabling a user to retrieve an item dropped in a drain trap. It shall be noted that it is difficult or impossible to retrieve a dropped item, e.g., jewelry, ring, coins, etc., using conventional tools, e.g., a plumber's snake, plunger or any existing tools in a simple manner. Although a plunger may be use to dislodge a mildly clogged drain by dislodging materials contributing to the clog, it is unsuitable for use in retrieving a dropped item in a sink drain.

One of the prior attempts in enabling clean out of a drain trap is disclosed in U.S. Pat. No. 4,031,914 to Neri (Hereinafter Neri). Neri discloses a drain trap having a clean out arrangement. The clean out arrangement comprises an upwardly extending branch that projects obliquely from the long vertical leg of the J-bend portion of a drain trap. The clean out branch has a relatively large diameter, being of substantially the same diameter as the J-bend itself. At its upper end the clean out branch has an easily removable, sealing closure. With the arrangement provided, the clean out opening is in a readily accessible location and the closure can be removed without tools to permit the trap to be cleaned. However, Neri's drain trap cannot be accessed without removing the cap (part 17 of Neri), causing liquid contained in the drain trap to spill uncontrollably to create a messy situation.

U.S. Pat. No. 1,515,073 to Savard (Hereinafter Savard) discloses a drain trap configured to be disposed in a discharge pipe to collect grease, dirt and other material which would tend to line the pipe and interfere with the proper discharge of fluid from the sink. It is said that the device can also be used for lavatories, bathtubs, urinals, etc.

Savard discloses a drain trap that can be removed in the upward direction, away from a sink upon which the drain trap is disposed. Although Savard's drain trap is capable of collecting a variety of materials poured into the drain trap-equipped sink, such type of drain trap is not customarily used in a modern sink, especially a bathroom sink as it is difficult to clean, unnecessarily trapping materials which can simply be sent to sewer or septic tank via drain pipe.

Thus, there is a need for a drain trap adaptor, when coupled to a drain trap, is capable of enabling controlled dismantlement of a drain trap, i.e., a practice that is performed without creating a messy situation and allowing retrieval of an entrapped item dropped in the drain trap.

SUMMARY OF THE INVENTION

In accordance with the present invention, there is provided a drain trap adaptor adapted to allow draining of a drain trap and retrieval of a material dropped in the drain trap. The drain trap includes a first drain pipe having an entry portion and an exit portion and a second drain pipe extending at a substantially acute angle from the exit portion of the first drain pipe and a bore disposed substantially at the exit portion of the first drain pipe. The first drain pipe and the second drain pipe collectively trap a first volumetric size of drainage. The drain trap adaptor includes:

(a) a ball valve having an inlet end and an outlet end, wherein the inlet end of the ball valve is adapted to connect to the bore; and (b) a container having a second volumetric size, the container is adapted to connect to the outlet end of the ball valve, wherein the container is configured to selectively receive the drainage trapped in the first and second drain pipes and the material at the bore upon opening of the ball valve such that the first and second drain pipes can be drained and the material can be retrieved when the container is removed from the ball valve.

There is further disclosed another embodiment of the present drain trap adaptor adapted to allow draining of a drain trap and retrieval of a material. The drain trap includes a first drain pipe having an entry portion and an exit portion and a second drain pipe extending at a substantially acute angle from the exit portion of the first drain pipe and a bore disposed substantially at the exit portion of the first drain pipe. The drain trap adaptor includes:

(a) a ball valve having an inlet end and an outlet end, wherein the inlet end of the ball valve is adapted to connect to the bore; and (b) a flexible hose adapted to connect to the outlet end of the ball valve at a first end, wherein the flexible hose is configured to be capable of being directed to a container for selectively receiving the drainage trapped in the first and second drain pipes and the material at the bore upon opening of the ball valve such that the first and second drain pipes can be drained and the material can be accessed and retrieved when the container is removed from the ball valve. In one embodiment, there is further a plug adapted to be plugged into the second end of the flexible hose to further ensure that no effluent exits the flexible hose even if the ball valve has been inadvertently opened.

In one embodiment, the second volumetric size is preferably larger than the first volumetric size such that all of the drainage trapped in the first and second drain pipes can be accommodated in the container.

In one embodiment, the ball valve further includes an actuation shaft and an actuation lever having a first portion extending substantially perpendicularly from the actuation shaft and a second portion extending substantially perpendicularly from the actuation shaft. The second portion is disposed at an obtuse angle relative to the first portion. In some embodiments, the ratio of the length of the first portion to the length of the second portion ranges from about 2:1 to about 3:1.

In some embodiments, the lumen size of the ball valve ranges from about 1 inch to about 1.25 inches.

An object of the present invention is to provide a drain trap adaptor capable of being adapted to a drain trap to enable controlled bleed of the drainage collected in the drain trap to avoid sudden disengagement of components making up the drain trap (e.g., when the drain trap is being dismantled to unclog the drain trap) that can cause messy situations due to uncontrolled flow of drainage in the trap.

Another object of the present invention is to provide a drain trap adaptor capable of being adapted to a drain trap to enable collection of any materials or items inadvertently dropped into the trap.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—sink
4—faucet
6—drain trap
8—drainage pipe leading to sewer or septic tank
10—drainage
12—ball valve
14—first portion of lever
16—second portion of lever
18—angle between first and second portions of lever
20—catchment container or bottle
22—drain tube
24—catchment basin
26—plug
28—item or material to be captured and retrieved
30—sink drain
32—first drain pipe
34—second drain pipe
36—bore
38—disposer
40—flap
42—drain valve
44—drain port
46—actuation shaft
48—ball valve lumen
50—seal
52—heel of collector
54—collector
56—difference in height between heel of collector and lowest point of outlet end of valve

PARTICULAR ADVANTAGES OF THE INVENTION

The present drain trap adaptor enables emptying of a drain trap at least of its liquid contents such that the drain trap can be dismantled for service. It shall be noted that prior to the present invention, the removal of any drain traps has been performed when the drain traps are still filled, potentially causing spillage of unsanitary and dirty water and materials under a sink.

The present drain trap adaptor enables emptying of a drain trap at least of its liquid contents such that the drain trap can be dismantled for service or replacement without causing spillage of unsanitary and dirty water and materials under a sink.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
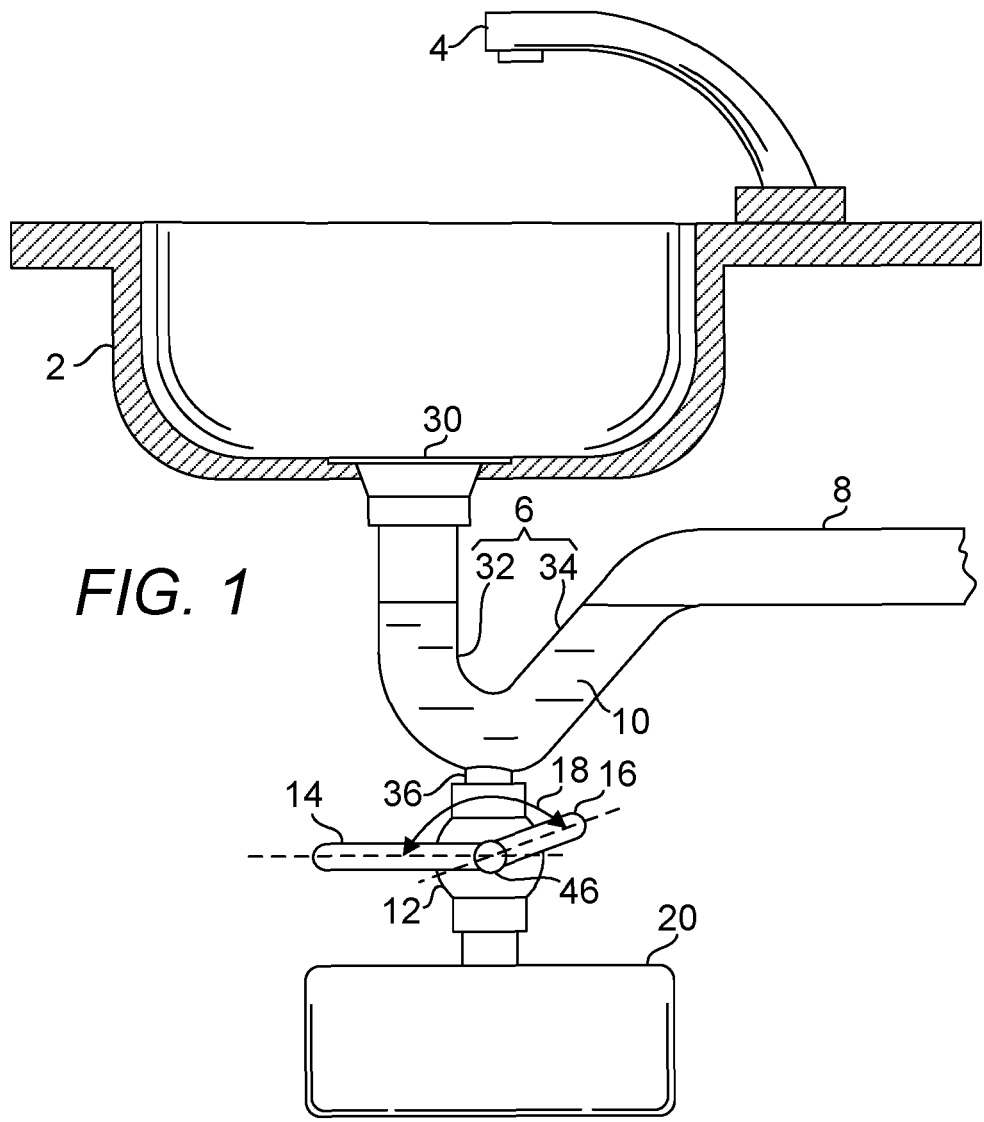
FIG. 1 is a partial cross-sectional view of a drain trap adaptor according to one embodiment of the present invention.

FIG. 1 is a partial cross-sectional view of a drain trap adaptor according to one embodiment of the present invention. In use, a sink 2 is typically configured to receive a water supply from faucet 4, contain the water supply and spills within it and drains the water flow into the drain trap which leads subsequently out to a sewer or septic tank. Disclosed herein is a drain trap adaptor adapted to allow draining of a drain trap and retrieval of a material. The drain trap 6 includes a first drain pipe 32 having an entry portion and an exit portion and a second drain pipe 34 extending at a substantially acute angle from the exit portion of the first drain pipe 32 and a bore 36 disposed substantially at the exit portion. The depth of the bore 36 is preferably sized such that when the ball valve 12 is installed to the drain trap 6, the distance between the bottom surface of the lumen of the drain trap 6 and the top surface of the ball of the ball valve 12 is about 1 inch. The first drain pipe 32 and the second drain pipe 34 collectively traps a first volumetric size of drainage. In this embodiment, the drain trap adaptor includes a ball valve 12 and a container 20. The ball valve 12 includes an inlet end and an outlet end, wherein the inlet end is adapted to connect to the bore 36. The container 20 includes a second volumetric size and is adapted to connect to the outlet end of the ball valve 12. The container 20 is configured to receive the drainage trapped in the first and second drain pipes 32, 34 and the material collected at the bore 36. Upon opening the ball valve 12, the drainage collected in the drain trap 6 and the material collected at the bore 36 is drained into the container 20. The material can be accessed or retrieved when the container 20 is removed from the ball valve 12. The first drain pipe 32 essentially assumes the shape of half of a U-shaped sink drain and the second drain pipe 34 extends in a substantially gradual linear upward slant or upslope from the exit portion of the first drain pipe 34 to ease "wash out" of suspended debris, hair, etc. In one embodiment, the ball valve further includes an actuation shaft and an actuation lever having a first portion 14 extending substantially perpendicularly from the actuation shaft 46 and a second portion 16 extending substantially perpendicularly from the actuation shaft 46. The second portion 16 is disposed at an obtuse angle 18 relative to the first portion 14, is about, e.g., 135 degrees to facilitate grasps of a hand. In yet another embodiment, the length of the first portion 14 is substantially similar to the length of the second portion 16 and angle 18 is substantially 180 degrees. In yet another embodiment, the lever only includes the first portion 14 and without the second portion 16. In some embodiments, the ratio of the length of the first portion to the length of the second portion ranges from about 2:1 to about 3:1 to provide a mechanical advantage of 2 times and 3 times, respectively. The actuation lever is preferably mounted such that the first portion 14 or the longer portion of the two portions 14, 16, points toward where the ball valve 12 is accessed from. In another embodiment, a second actuation lever is mirrored on the opposite side of the ball valve 12. By having two levers, a user is able to grasp the two levers simultaneously, making opening or closing of the ball valve easier or this would suit either a right-handed or left-handed user. In opening or closing a ball valve, a torque ranging from about 10 to about 15 in-lb is typically required, therefore discouraging its widespread use in consumer products. Applicant discovered that by disposing a ball valve at the bore, any potential leak through the bore can be positively prevented. With a ball valve, any concerns with shelf life of the ball valve can be eliminated as any potential build-up over time on ball valve surfaces exposed to the drainage does not affect its performance. In one embodiment, the second volumetric size is preferably larger than the first volumetric size such that all of the drainage trapped in the first and second drain pipes can be accommodated in the container. In some embodiments, the lumen size of the ball valve ranges from about 1 inch to about 1.25 inch, sufficient to allow most small valuables, e.g., rings, jewelry, coins, etc., through. Further, the present adaptor of all embodiments disclosed herein allows user access to clogged drain pipes to clear blockage-causing materials, removing the need to dismantle the drain pipes which will cost more effort and time. Yet further, the present adaptor of all embodiments disclosed herein allows user access to clogged drain pipes without first causing a wet, dirty, unsanitary and messy situation under drain pipes. In applications where a material to be retrieve must traverse the lumen of a valve, the valve may be selected from other types of valves provided the valve lumen is sufficiently large to allow such traverse and the valve be leak-free in its closed state.

Figure 2:
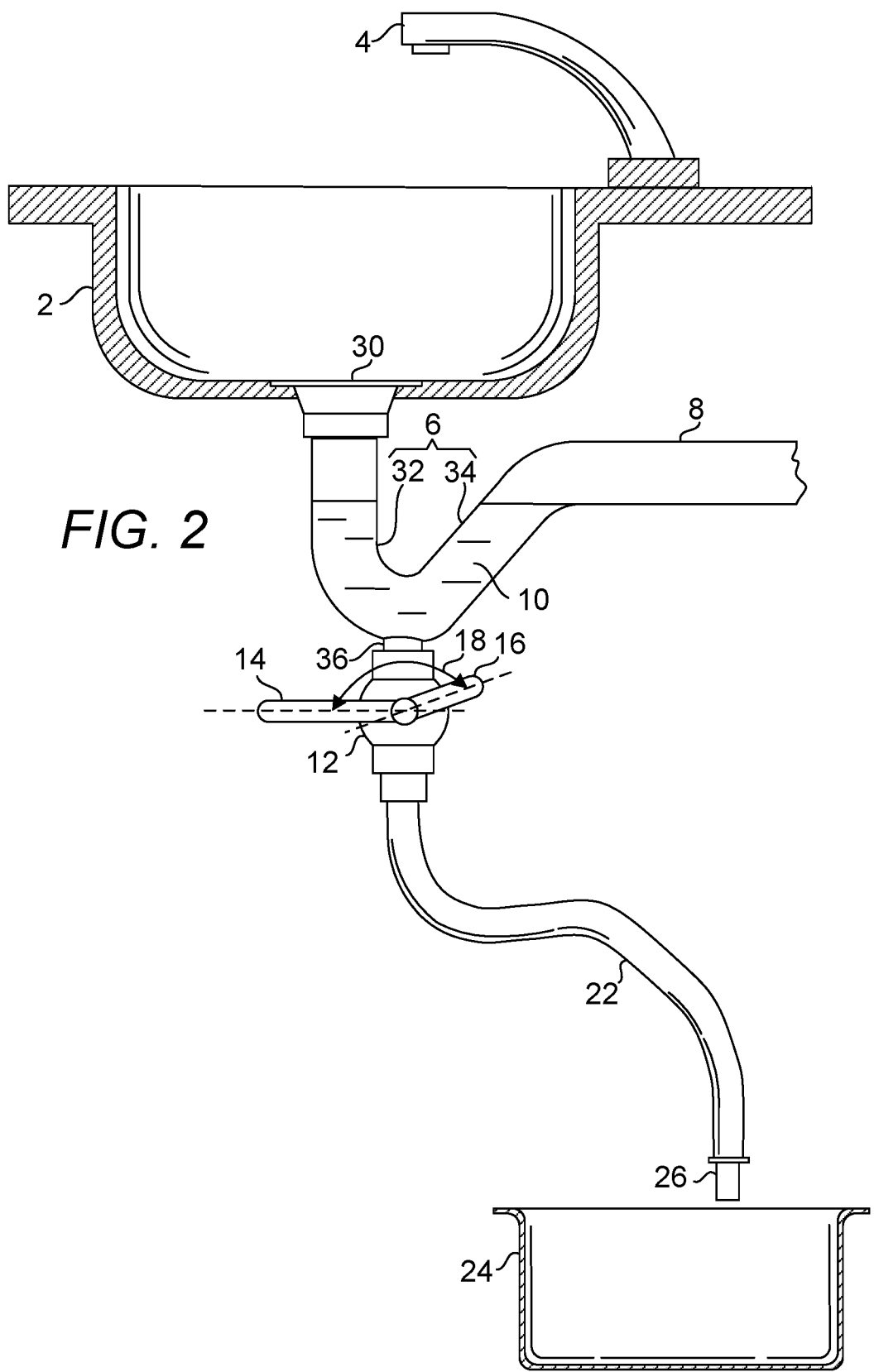
FIG. 2 is a partial cross-sectional view of a drain trap adaptor according to another embodiment of the present invention.

FIG. 2 is a partial cross-sectional view of a drain trap adaptor according to another embodiment of the present invention. In this embodiment, the drain trap adaptor includes a ball valve 12 having an inlet end and an outlet end. The inlet end is adapted to connect to the bore 36. The drain trap adaptor further includes a flexible hose 22 adapted to connect to the outlet end of the ball valve at a first end the flexible hose 22. In yet another embodiment, a plug 26 is further provided to prevent spillage of drainage if the ball valve 12 is accidentally opened or to prevent blockage due to intrusions of e.g., insects and arachnids, in the lumen of the flexible hose 22 through the second end of the flexible hose 22.

The flexible hose 22 is configured to be capable of being directed to a container for receiving the drainage trapped in the first and second drain pipes 32, 34 and the material at the exit portion of the first drain pipe 32 (or at the bore 36) upon the opening of the ball valve 12 such that the first and second drain pipes 32, 34 can be drained and the material can be retrieved when the container 20 is removed from the ball valve 12. Once the tip of the flexible hose 22 has been disposed in a catchment container or bottle 24, the ball valve 12 may be then opened to bleed the drainage contained in the first and second drain pipes 32, 34.

Figure 3:
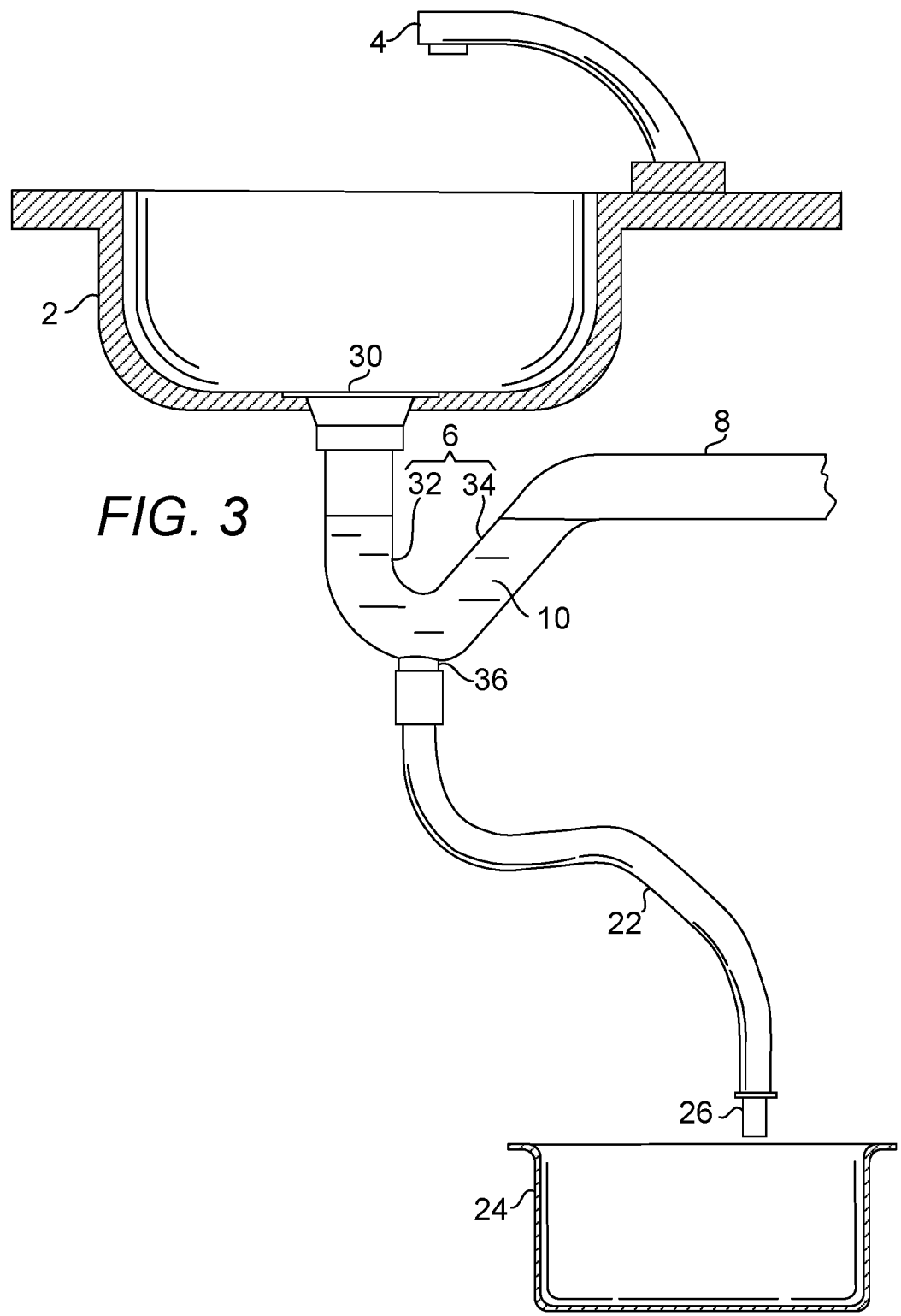
FIG. 3 is a partial cross-sectional view of a drain trap adaptor according to yet another embodiment of the present invention.

FIG. 3 is a partial cross-sectional view of a drain trap adaptor according to yet another embodiment of the present invention. Although less desirable than the embodiments disclosed elsewhere herein, this embodiment does not require a ball valve. Instead, the effluent flowrate from the flexible hose 22 is controlled by virtue of the lumen size of hose. As the lumen of the flexible hose 22 is rather long and narrow, food or other wastes may be collected in the lumen and potentially clogging the flexible hose 22.

Figure 4:
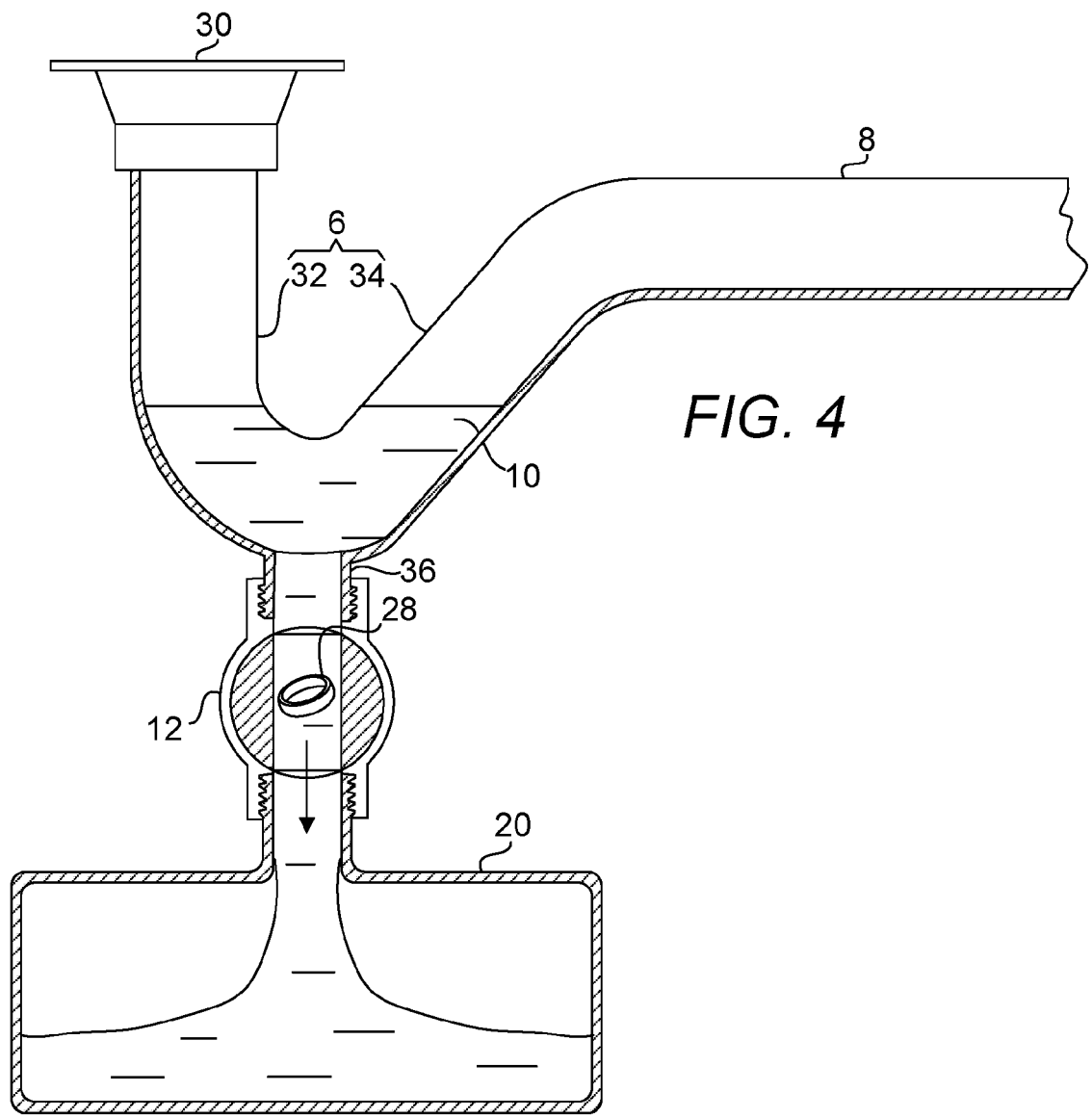
FIG. 4 is a partial cross-sectional view of a drain trap adaptor, depicting an item being collected in a container of the drain trap adaptor.

FIG. 4 is a partial cross-sectional view of a drain trap adaptor, depicting an item 28 inadvertently dropped into the drain trap is being collected in a container 20 of the drain trap adaptor. The ball valve 12 is shown disposed in its fully opened position, resulting in a lumen that approximates that of the bore 36. During normal operation, the ball valve is disposed in a closed position. Therefore a dropped item 28, e.g., ring, valuable, jewelry, etc., is stopped at the top of the ball of the ball valve 12. A dropped item is preferably retrieved immediately after it is inadvertently dropped, without running more water into the drain trap for fear that the additional effluent may pick up the item 28 intended to be retrieved and continue to push the item 28 down to the sewer or septic tank.

Figure 5:
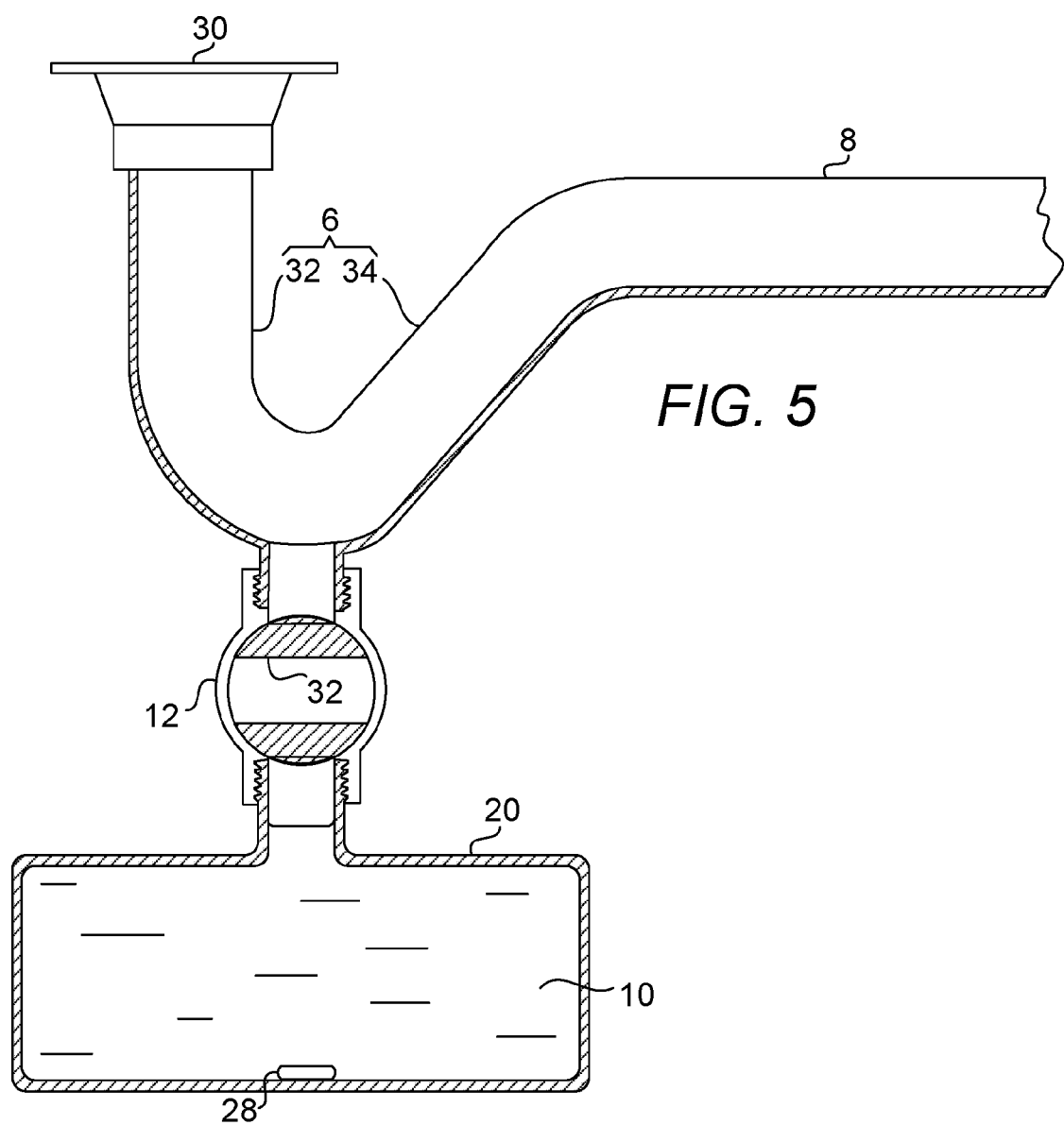
FIG. 5 is a partial cross-sectional view of a drain trap adaptor, depicting an item having been collected in a container of the drain trap adaptor.

FIG. 5 is a partial cross-sectional view of a drain trap adaptor, depicting an item 28 having been collected in a container of the drain trap adaptor. It shall be noted that the ball valve 12 is now closed. The drainage contained in the drain trap has been collected in the container 20. Therefore, it is now safe to remove the container from the ball valve by unscrewing the mouth of the container 20 from the outlet end of the ball valve 12. In order to retrieve the item 28, the container 20 is then emptied and then the item 20 retrieved.

Figure 6:
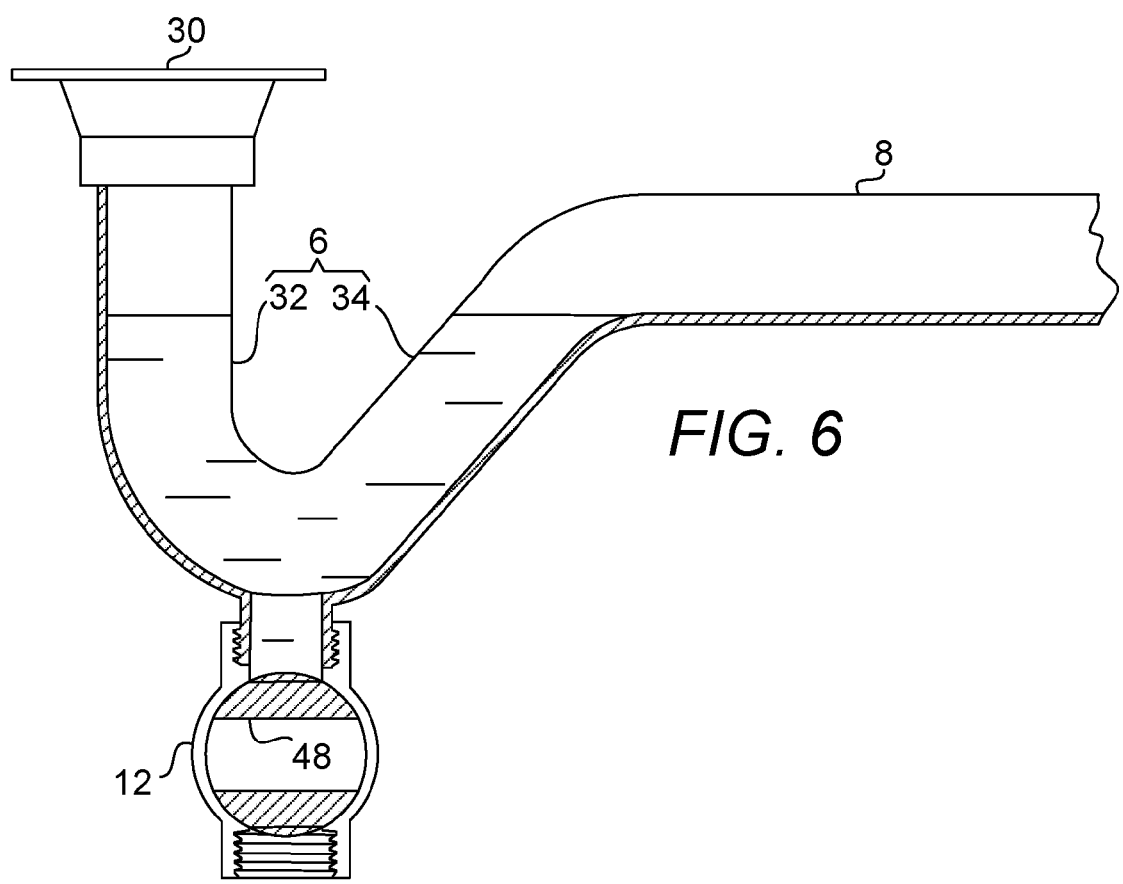
FIG. 6 is a partial cross-sectional view of a drain trap adaptor, depicting the downstream equipment of the ball valve having been removed.

FIG. 6 is a partial cross-sectional view of a drain trap adaptor, depicting the downstream equipment of the ball valve 12, e.g., container 20 and flexible hose 22, having been removed. It shall be noted that, without a container or a plugged or unplugged flexible tube, the drain trap can be put in service. The container can alternatively be left unattached to the outlet end of the ball valve 12 until such time as when emptying of the drain trap becomes necessary. However, if the container is left attached in place to the ball valve 12, the drain trap may be drained at any time. In order to avoid overfilling of a container, care shall be taken to avoid refilling of the drain trap once the ball valve 12 has started to be bled or the container shall be emptied before it is completely filled. Before a container is removed, care shall be taken to close the ball valve 12 to ensure that the container is not overfilled or spillage will occur.

Figure 7:
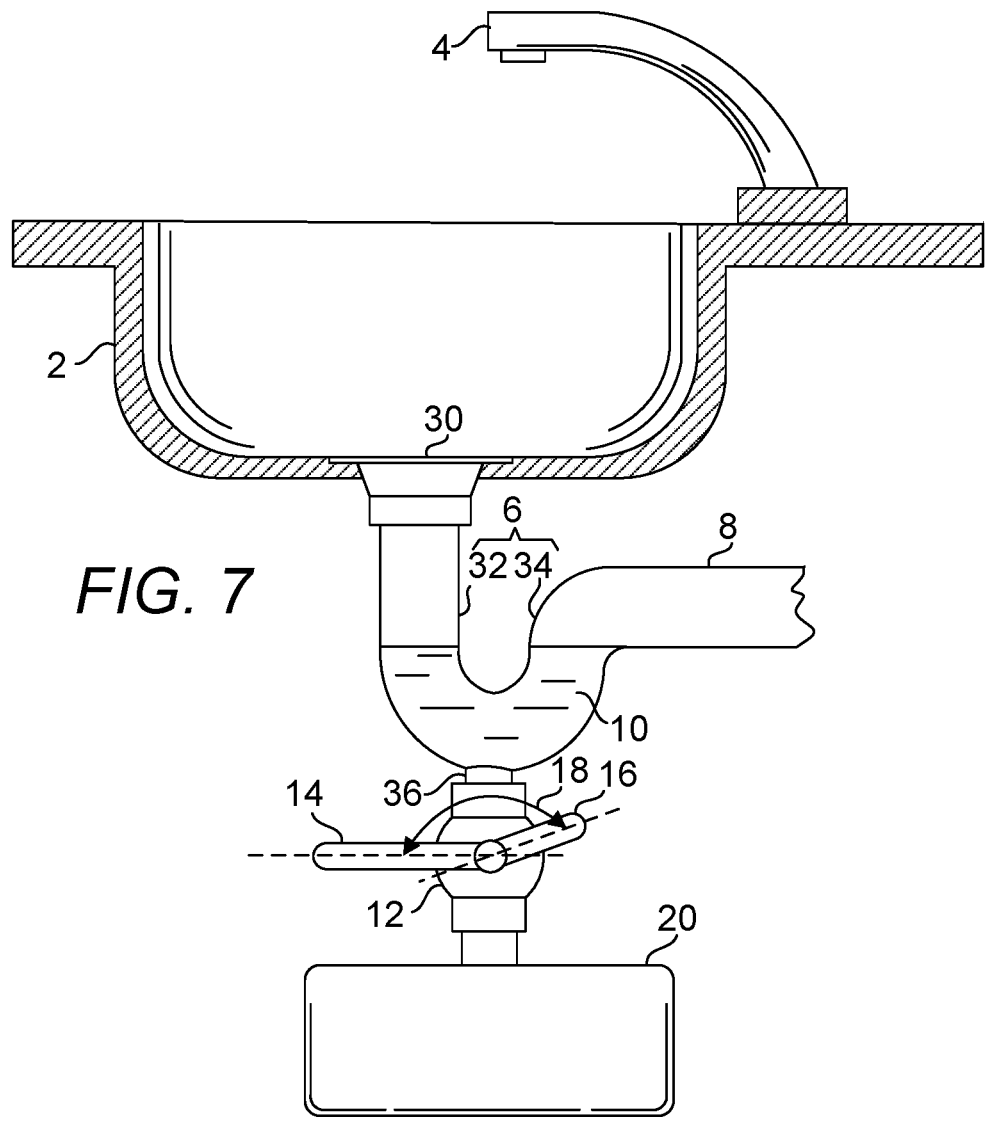
FIG. 7 is a partial cross-sectional view of a drain trap adaptor according to one embodiment of the present invention and adapted to a U-shaped drain trap.

FIG. 7 is a partial cross-sectional view of a drain trap adaptor according to one embodiment of the present invention and adapted to a U-shaped drain trap. Although not as desirable as the embodiment shown in FIG. 1, the drain trap of FIG. 7 also allows trapping of a column of water to isolate the sink from the environment of the sewer or septic tank.

Figure 8:
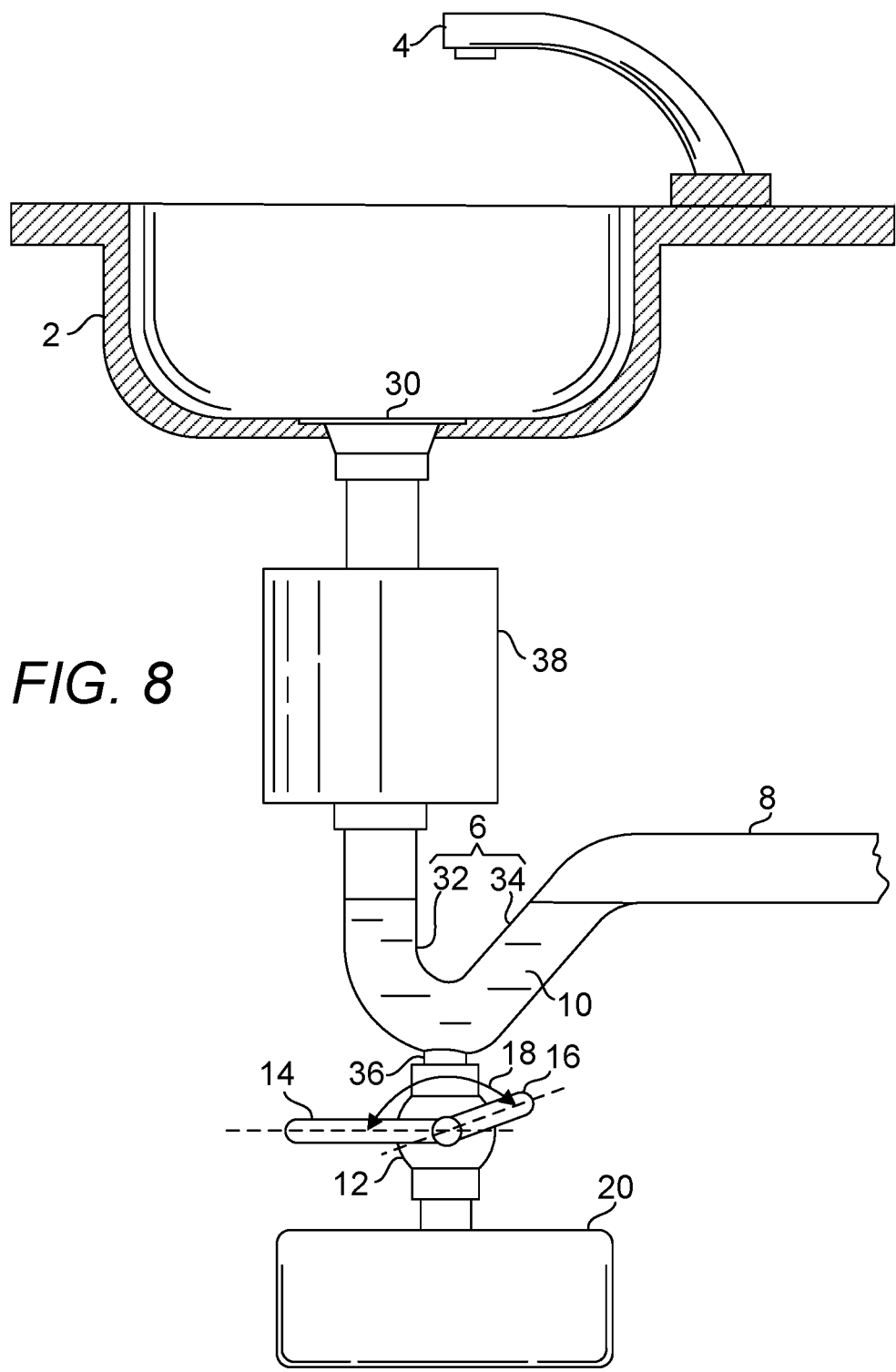
FIG. 8 is a partial cross-sectional view of a drain trap adaptor according to one embodiment of the present invention and where the drain trap is adapted to a disposer.

FIG. 8 is a partial cross-sectional view of a drain trap adaptor according to one embodiment of the present invention and where the drain trap is adapted to a disposer 38. In this configuration, a disposer 38 is adapted to receive drainage from the sink and feed the effluent of the disposer 38 into the drain trap 6.

In all instances disclosed herein, a bore 36 and the lumen of a ball valve 12 are preferably sized sufficiently large, e.g., at least one inch, to allow any items to be collected to flow through. In one embodiment, the lumen of a flexible hose 22 is suitably sized to allow any items to be collected to flow through. In another embodiment, the lumen of a flexible hose 22 need not be so large as to accommodate items to be retrieved. In this case, the flexible hose 22 is simply used to drain the fluids collected in the drain pipes and ball valve before the flexible hose is removed for access to the ball valve's contents.

Figure 9:
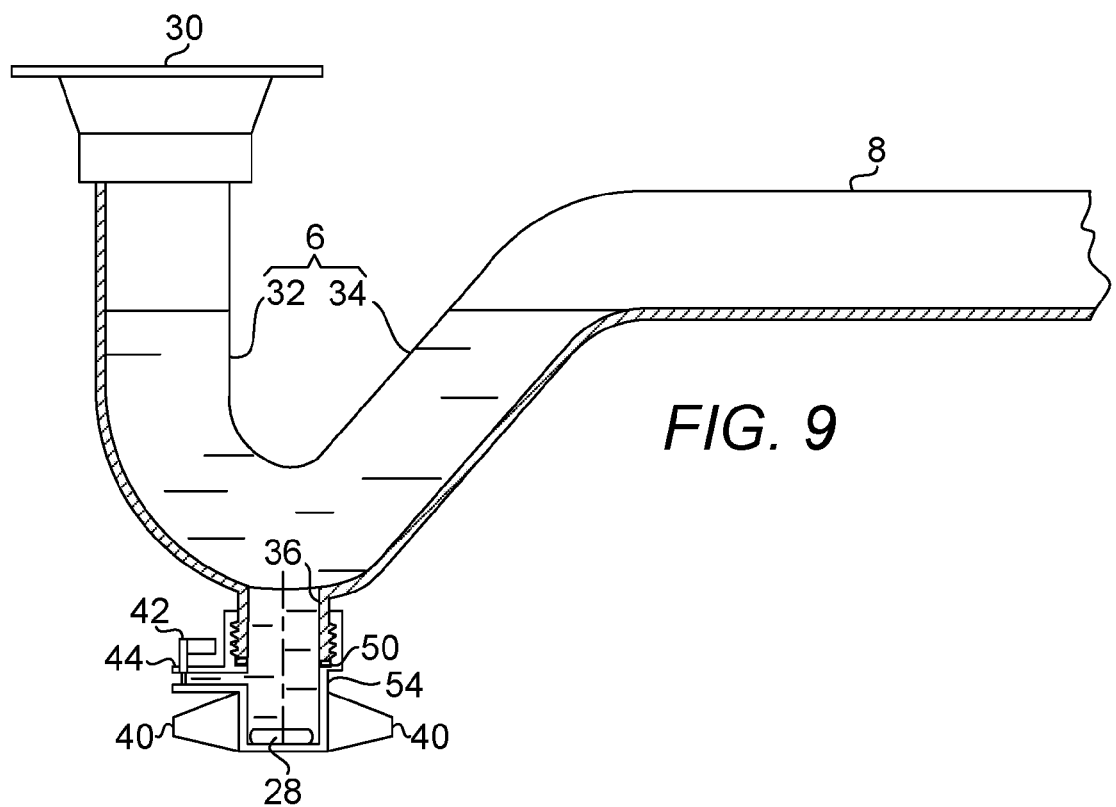
FIG. 9 is a partial cross-sectional view of a drain trap adaptor according to one embodiment of the present invention.

FIG. 9 is a partial cross-sectional view of a drain trap adaptor according to one embodiment of the present invention and adapted to a drain trap. In this configuration, no discrete container or discrete collector is required. The adaptor includes a collector 54 having a threaded end adapted to be removably coupled to the drain trap at one end of the collector 54, a closed end disposed on the opposite end from the threaded end of the collector, a drain port 44 controlled using a valve 42 and extends from a location of the collector between the threaded end and the closed end. The collector 54 is essentially configured in a cylindrical shape having a central axis that is aligned with the central axis of the bore 36. An 'O'-ring may be used as a seal 50 between the lip of the bore and the collector 54 to prevent any leaks of the effluent. A flexible hose or another fluid path may alternatively be connected to the drain port 44 at all times or only when draining of the contents of the adaptor is required. In the embodiment shown, the adaptor is also equipped with two flaps 40 oppositely disposed about the central axis of the collector for facilitating grasps of a user during removal or reseating of the adaptor. In use, fluids collected in the adaptor can be drained prior to the adaptor being removed, thereby eliminating inconveniences associated with removing a drain trap and drain trap adaptor that are full of drainage. Care shall be taken to remove the adaptor as a small amount of effluent may still be collected at a level below the drain port 44. Compared to other container-equipped embodiments disclosed elsewhere herein, this embodiment is more compact and takes up less space underneath a sink area and is able to capture a significant amount materials to be retrieved.

Figure 10:
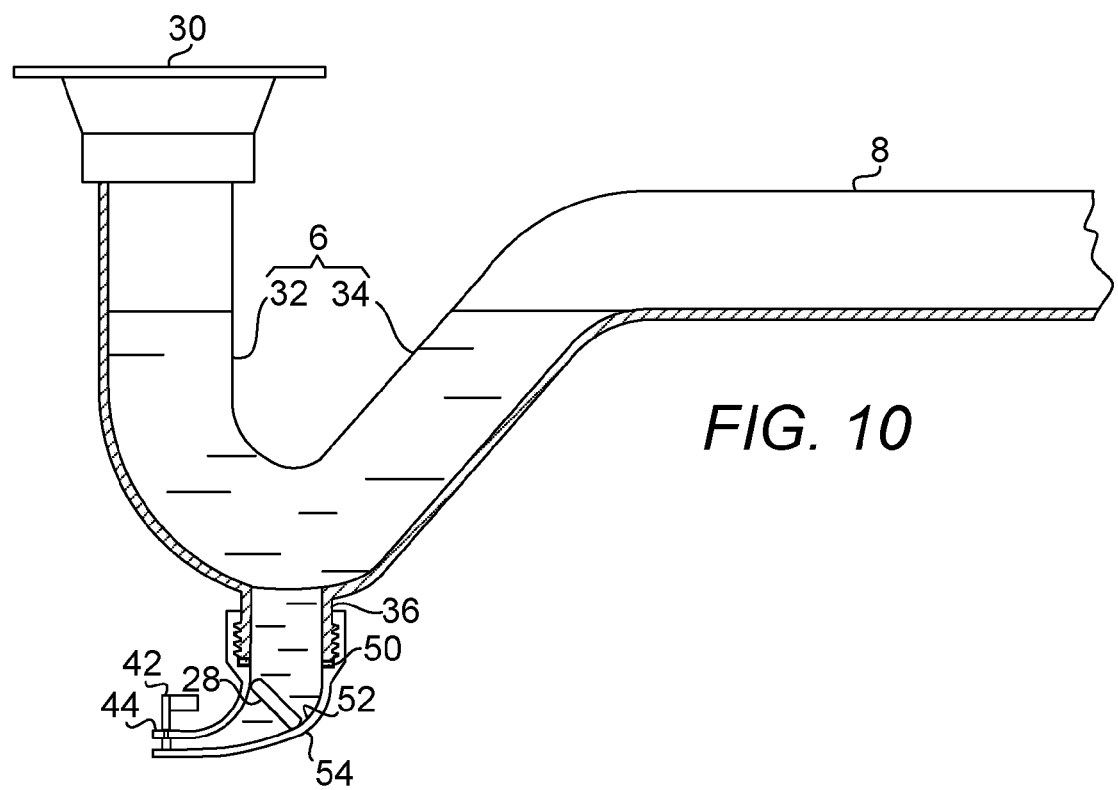
FIG. 10 is a partial cross-sectional view of a drain trap adaptor according to one embodiment of the present invention.
Figure 11:
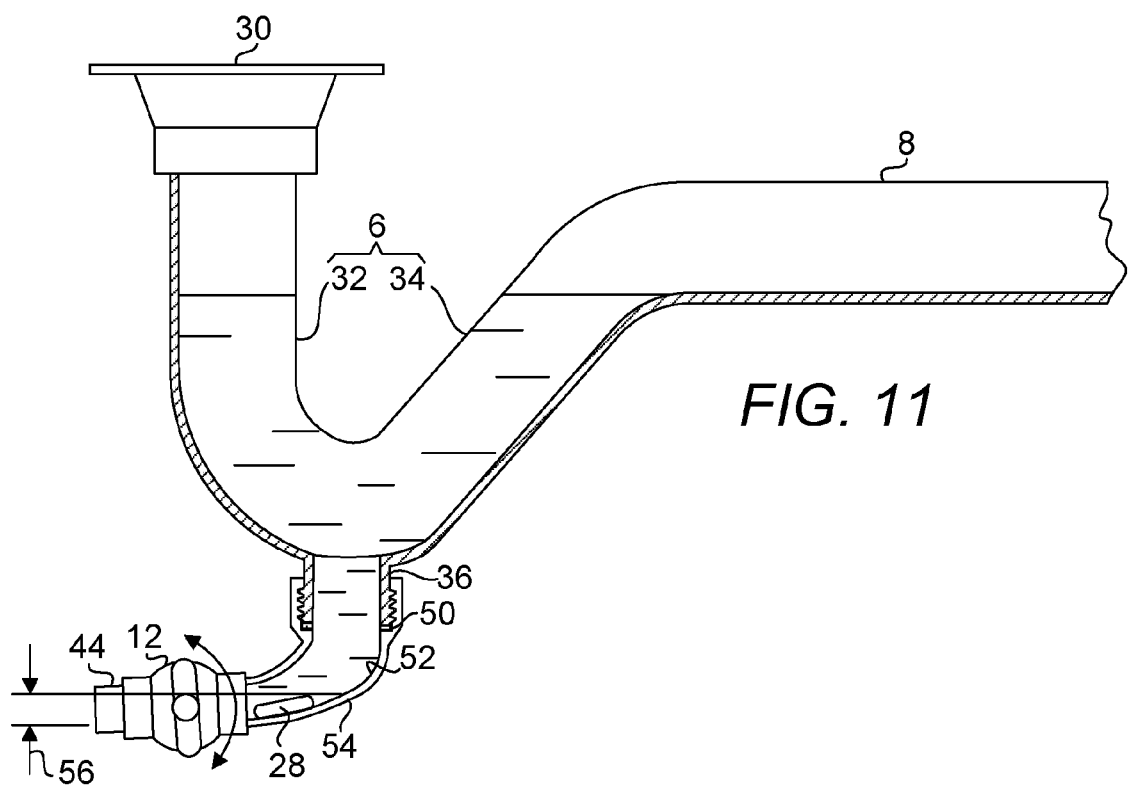
FIG. 11 is a partial cross-sectional view of a drain trap adaptor according to the embodiment disclosed in FIG. 10 with the use of a ball valve.

FIG. 10 is a partial cross-sectional view of a drain trap adaptor according to one embodiment of the present invention and adapted to a drain trap. Similar to the embodiment shown in FIG. 9, this embodiment is not equipped with a separately available container. A drain port 44 is however disposed at the lowest point of the adaptor when installed. Therefore, when installed, the heel 52 of the collector is disposed at level that is higher than the lowest level of the lumen of the drain port 44 to ease draining of effluent and materials from the adaptor and drain pipes by gravity. It shall be noted that there is a difference in elevation 56 between the heel 54 and the lowest level of the lumen of the drain port 44. Again, a valve 42 is used to selectively drain the contents of the adaptor with or without using a flexible hose. It shall be noted that the drain port 44 is biased to one side with respect to the central axis of the collector, saving some vertical space underneath the sink area. FIG. 11 is a partial cross-sectional view of a drain trap adaptor according to the embodiment disclosed in FIG. 10 with the use of a ball valve 12. In one embodiment, a ball valve 12 having a lumen of about 0.5 inch to about 1.25 inches in diameter is used. With this adaptor, a user may elect to remove the adaptor after draining the drain trap 6 and adaptor to retrieve a material. The lumen of the ball valve 12 may also be sufficiently large that a material may be drained together with the effluent. In the latter, the need to remove the adaptor can be avoided. An additional fluid path, e.g., a hose, may also be connected to the drain port 44 to ease an effort in directing the flow of the contents of the adaptor and the drain pipes. The ball valve characteristics disclosed in FIGS. 1-2 may also be used in the valves disclosed in any of the adaptors herein.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A drain trap adaptor adapted to allow draining of a drain trap and said drain trap adaptor and retrieval of a material trapped within the drain trap, wherein the drain trap having a first drain pipe having an entry portion and an exit portion and a second drain pipe extending from the exit portion of the first drain pipe and a bore disposed substantially at the exit portion of the first drain pipe and the first drain pipe and the second drain pipe collectively traps a first volumetric size of drainage, said drain trap adaptor comprising:
    (a) a ball valve having an inlet end, an outlet end, an actuation shaft and an actuation lever having a first portion extending substantially perpendicularly from said actuation shaft and a second portion extending substantially perpendicularly from said actuation shaft, said second portion is disposed at an obtuse angle relative to said first portion at about 135 degrees, wherein said inlet end of said valve is adapted to connect to the bore; and
    (b) a container having a second volumetric size, said container is adapted to connect to the outlet end of said valve,
wherein said container is configured to selectively receive the drainage and the material trapped within the drain trap and upon opening of said valve, the drainage can be collected and the material can be retrieved when said container is removed from said valve.

2. The drain trap adaptor of claim 1, wherein the size of said ball valve ranges from about 1 inch to about 1.25 inches.

3. The drain trap adaptor of claim 1, wherein the ratio of the length of said first portion to the length of said second portion ranges from about 2:1 to about 3:1.

4. The drain trap adaptor of claim 1, wherein said second volumetric size is larger than the first volumetric size such that all of the drainage can be accommodated in said container.

5. A drain trap adaptor adapted to allow draining of a drain trap and said drain trap adaptor and retrieval of a material trapped within the drain trap, wherein the drain trap having a first drain pipe having an entry portion and an exit portion and a second drain pipe extending from the exit portion of the first drain pipe and a bore disposed substantially at the exit portion of the first drain pipe, said drain trap adaptor consisting of:
    (a) a valve having an inlet end and an outlet end, wherein said inlet end of said valve is adapted to connect to the bore and said outlet end of said valve is disposed at a lowest level of said valve; and
    (b) a flexible hose having a first end and a second end, said flexible hose is adapted to connect to the outlet end of said valve at said first end of said flexible hose,
wherein said flexible hose is configured to be capable of being directed to a container for selectively receiving the drainage and the material trapped within the drain trap and upon opening of said valve, the drainage can be collected and the material can be retrieved.

6. The drain trap adaptor of claim 5, wherein said valve is a ball valve.

7. The drain trap adaptor of claim 6, wherein the size of said ball valve ranges from about 1 inch to about 1.25 inches.

8. The drain trap adaptor of claim 6, wherein said ball valve further comprises an actuation shaft and an actuation lever having a first portion extending substantially perpendicularly from said actuation shaft and a second portion extending substantially perpendicularly from said actuation shaft, said second portion is disposed at an obtuse angle relative to said first portion.

9. The drain trap adaptor of claim 8, wherein the ratio of the length of said first portion to the length of said second portion ranges from about 2:1 to about 3:1.

10. The drain trap adaptor of claim 5, further comprising a plug adapted to be plugged into said second end of said flexible hose.

11. A drain trap adaptor adapted to allow draining of a drain trap and said drain trap adaptor and retrieval of a material trapped within the drain trap, wherein the drain trap having a first drain pipe having an entry portion and an exit portion and a second drain pipe extending from the exit portion of the first drain pipe and a bore disposed substantially at the exit portion of the first drain pipe, said drain trap adaptor comprising:
    (a) a collector having an inlet end, an outlet end and a heel interposed between said inlet end of said collector and said outlet end of said collector, wherein said heel slopes downwardly from said inlet end of said collector to said outlet end of said collector; and
    (b) a valve having an inlet end and an outlet end, wherein said inlet end of said valve is adapted to said outlet end of said collector,
wherein said heel is disposed at a level that is higher than said outlet end of said valve and said collector is configured to receive a drainage trapped in the drain trap and the material and upon opening of said valve, the drainage is drainable and the material is retrievable.

12. The drain trap adaptor of claim 11, wherein said valve is a ball valve.

13. The drain trap adaptor of claim 12, wherein the size of said ball valve ranges from about 1 inch to about 1.25 inches.

14. The drain trap adaptor of claim 12, wherein said ball valve further comprises an actuation shaft and an actuation lever having a first portion extending substantially perpendicularly from said actuation shaft and a second portion extending substantially perpendicularly from said actuation shaft, said second portion is disposed at an obtuse angle relative to said first portion.

15. The drain trap adaptor of claim 14, wherein the ratio of the length of said first portion to the length of said second portion ranges from about 2:1 to about 3:1.

16. The drain trap adaptor of claim 11, further comprising a flexible hose adapted to connect to said outlet end of said valve at a first end, wherein said flexible hose is configured to be capable of being directed to a container for selectively receiving the drainage and the material trapped in the drain trap upon opening of said valve such that the drainage can be drained and the material can be retrieved.

17. The drain trap adaptor of claim 16, further comprising a plug adapted to be plugged into a second end of said flexible hose.

18. The drain trap adaptor of claim 11, wherein said inlet end of said collector is configured to be removably coupled to the bore.

\* \* \* \* \*